Nov. 15, 1927.
F. W. LOWE
1,649,071
LOCK BOLT AND NUT
Filed Aug. 14, 1926
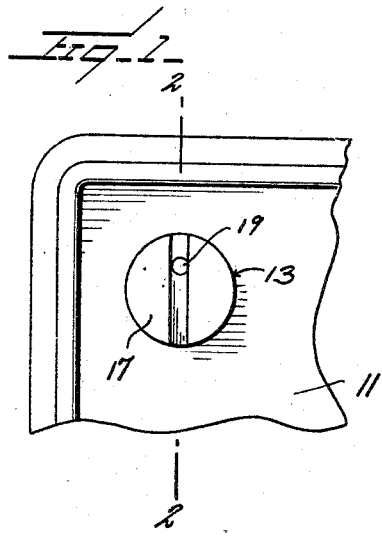
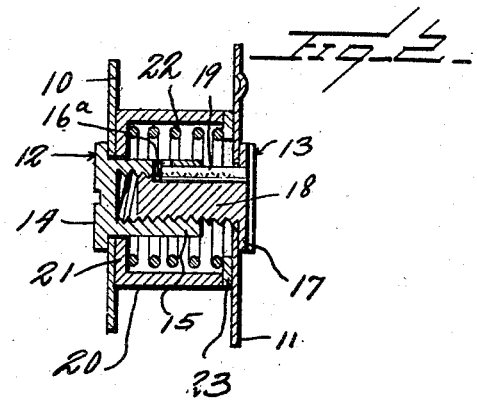
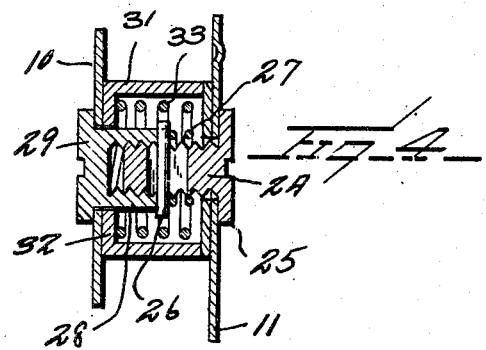
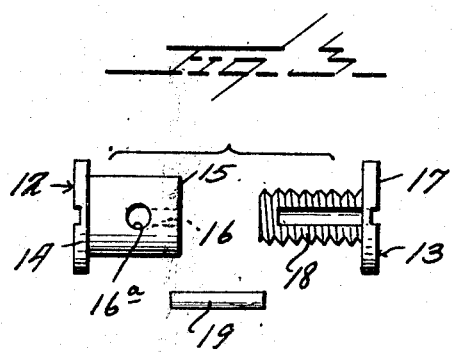
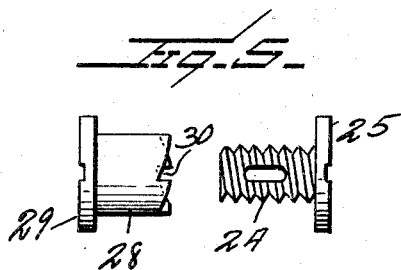
Inventor
F. W. Lowe
By Watson E. Coleman
Attorney Patented Nov. 15, 1927.

1,649,071

UNITED STATES PATENT OFFICE.

FRANK W. LOWE, OF CAMDEN, ARKANSAS.

LOCK BOLT AND NUT.

Application filed August 14, 1926. Serial No. 129,235.

This invention relates to bolts and the general object of the invention is to provide a bolt having a nut or equivalent member so constructed that the nut cannot be removed from the bolt under ordinary circumstances and a further object is to provide a bolt which is particularly adapted for use in holding license plates in place upon license plate carriers so that the license plate cannot be removed or the bolt detached unless the license plate be cut and thereby so mutilated that it cannot be thereafter used. This prevents the stealing of license plates and the transferring thereof from one machine to another.

Other objects will appear in the course of the following description.

My invention is illustrated in the accompanying drawings wherein:—

Figure 1 is a fragmentary elevation of a license plate showing my fastening device applied thereto;

Fig. 2 is a section on the line 2—2 of Figure 1;

Fig. 3 is an elevation showing the parts of the bolt separated;

Fig. 4 is a longitudinal section like Figure 2 but showing a modification of the device;

Fig. 5 is an elevation showing the two-part bolt.

It will be seen that in the drawings I have illustrated two forms of my invention and in the form shown in Figures 1 to 3, 10 designates the sheet metal plate of the carrier which is designed to support a license plate 11. It will be understood that this is purely illustrative of one application of my invention. The bolt is formed of two sections 12 and 13. The section 12 has a relatively large head 14 which may be transversely nicked and a tubular barrel 15 which is interiorly screw-threaded and formed with a longitudinally extending slot 16, terminating in a hole 16ᵃ. The other section 13 has a head 17 and a screw-threaded shank 18, this shank being longitudinally grooved and the head is apertured to align with this groove so as to permit the insertion of a key 19, which key fits the groove and the aperture in the head so tightly as to prevent its coming out except where it is forced out by the application of a proper tool. When this key is inserted it locks the shank 18 to the barrel 15 and prevents the two parts from being turned upon each other. By inserting an instrument in the hole 16ᵃ, the key may be shifted outward through the shank 18 a sufficient distance to permit the key to be gripped by pliers and pulled out. The license plate and the back plate 10 have apertures just large enough for the passage of the shank 18 and of the barrel and these two parts are spaced apart by a collar or sleeve 20 which preferably carries at one end the head 21. Surrounding the bolt is a coiled compression spring 22 which bears at one end against the head 21 and at the other bears against a washer 23, the extremity of the spring extending through this washer and being engaged therewith. The washer 23 has a central opening large enough to permit the passage of the head 17.

In the use of this device, the spring acts to press the two plates 10 and 11 tightly against the heads of the bolt and any effort to turn off the nut simply results in turning the bolt itself as a unit without any effect in turning off the nut and this is true even though the heads 14 and 17 are attempted to be turned in opposite directions. Inasmuch as the parts are case hardened it is impossible to cut off the heads of the bolt and the only way in which it is possible to remove the license plate 11 is by cutting off the corners of the license plate, thus mutilating it so that it cannot be later used. If it be desired to remove the lock bolt and nut, the corner of the license plate which has been cut off is then cut closely around the head 17. As soon as this occurs, the head 17 may be forced rearward through the washer, carrying with it, of course, the shank 18 and thus carrying with it the section 12 until the drift opening or hole 16ᵃ is disclosed beyond the element 10. Then an instrument may be inserted within this drift opening to force out the key 19, whereupon the two parts 12 and 13 may be unscrewed from each other.

In Figure 4 I have illustrated another form of my invention which I consider preferable and in this form the bolt consists of the male section 24 having the head 25 and having the transversely extending aperture through which a pin or key 26 passes, this key being the equivalent of the key 19 in Figure 2. A spring 27 is designed to bear against the license plate 11 and against this key. The female section 28 of the bolt is interiorly screw-threaded to receive the shank 24 and is provided with a head 29. The inner end of the barrel or female section is formed with ratchet notches 30 designed to engage the key 26. When these parts are screwed together, the ratchet notches will cause the key 26 to be gradually forced downward in the longitudinal slot in the shank 24 and then if any attempt be made to rotate the section 28 in the opposite direction, the ratchet notches will engage with the key and the two sections will rotate together. The plates 10 and 11 are spaced apart by means of a collar or sleeve 31 having an apertured head 32 at its inner end through which the member 28 passes.

A spring 33 is disposed within the collar 31 and bears against the head 32 and against the plate 11. Here again all the parts are to be made of case hardened material so that they cannot be cut and the only way to remove the license plate is by mutilating the license plate by cutting off the corners. If the license plate is cut off around the head of the bolt, the spring 33 and the collar 31 will come out over the head. Then it is only necessary to pull out the collar 31 and that by reason of the back washer 32, will pull the key out of the notches 30 and then the bolt may be unscrewed. While I have described this device as being particularly adapted to holding license plates upon their carriers for the reasons stated, I do not wish to be limited to this as it is obvious that it might be used in a large variety of different situations.

It will be seen that with this construction the license plate or other sheet metal plate is held securely between the male and female bolt sections and there is no way possible to remove a license plate without so damaging it as to render it useless. The collar which surrounds the bolt absolutely prevents the insertion of an instrument which will disengage the two sections of the bolt from each other when the bolt is in place and the spring acts to take up any rattle and jar, a very important feature of bolts of this character.

I claim:—

1. A bolt of the character described comprising a male and a female member each having a head and having screw-threaded engagement with each other, one of said members having a key operatively engaging the other member and preventing individual movement of the two members, a compression spring surrounding the shank of the bolt, and a collar having an apertured head through which the bolt passes, the spring being enclosed within the collar.

2. A bolt of the character described comprising a male and a female member having screw-threaded engagement with each other, the male member having a longitudinally extending slot and a transversely extending key disposed in said slot, a spring surrounding the shank of the male member and urging said key outward in the slot, the female member having ratchet notches at its inner end adapted to engage said key and prevent the reverse movement of the female member upon the male member.

3. A bolt of the character described comprising a male and a female member having screw-threaded engagement with each other, the male member having a longitudinally extending slot and a transversely extending key disposed in said slot, a spring surrounding the shank of the male member and urging said key outward in the slot, the female member having ratchet notches at its inner end adapted to engage said key and prevent the reverse movement of the female member upon the male member, a coiled compression spring surrounding the bolt, a collar within which the spring is enclosed and having an apertured head, and a washer against which the opposite end of the spring bears.

4. The combination with two plates designed to be held together, of a bolt for holding the plates formed in two sections, each section having a head, one section having an interiorly screw-threaded shank, a coiled compression spring surrounding the bolt between the heads thereof, a collar enclosing the compression spring and having an apertured head at one end through which the bolt passes and bearing against one of said plates, and a washer through which the bolt passes and against which the opposite end of the spring bears, said washer bearing against the other plate.

5. The combination with two plates designed to be held together, of a bolt for holding the plates formed in two sections, each section having a head, one section having an interiorly screw-threaded shank and the other an exteriorly screw-threaded shank, a key engaging the shanks of the two sections to each other for unitary rotative movement, a coiled compression spring surrounding the bolt between the heads thereof, a collar enclosing the compression spring and having an apertured head at one end through which the bolt passes and bearing against one of said plates, and a washer through which the bolt passes and against which the opposite end of the spring bears, said washer bearing against the other plate.

In testimony whereof I hereunto affix my signature.

FRANK W. LOWE.